United States Patent [19]
Li

[11] Patent Number: 5,544,742
[45] Date of Patent: Aug. 13, 1996

[54] DISK STORAGE BOX

[76] Inventor: Chin-Chu Li, No. 1-4, Wu Nan Rd., Wu Chi Chen, Taichung Hsien, Taiwan

[21] Appl. No.: 412,169

[22] Filed: Mar. 28, 1995

[51] Int. Cl.$^6$ ................................................. B65D 85/57
[52] U.S. Cl. ........................ 206/308.3; 206/307; 206/751
[58] Field of Search ................................ 206/308.3, 307, 206/307.1, 45, 45.13, 45.14, 45.15, 45.2, 499

[56] References Cited

U.S. PATENT DOCUMENTS

| | | | |
|---|---|---|---|
| 4,387,802 | 6/1983 | Shearing et al. | 206/45 |
| 4,519,893 | 5/1985 | Olas | 206/311 |
| 4,527,692 | 7/1985 | Neuman | 206/45 X |
| 4,684,019 | 8/1987 | Egly | 206/309 |
| 4,759,443 | 7/1988 | Egly | 206/425 |
| 4,776,457 | 10/1988 | Ferraroni | 206/45.23 |
| 4,889,244 | 12/1989 | Hehn et al. | 206/307.1 |
| 5,373,945 | 12/1994 | Niehaus | 206/308.3 X |
| 5,411,135 | 5/1995 | Danzyger et al. | 206/45.15 |

*Primary Examiner*—Paul T. Sewell
*Assistant Examiner*—Tara L. Laster
*Attorney, Agent, or Firm*—Limbach & Limbach

[57] ABSTRACT

A disk storage box including a cover, which has an inside elongated locating block and a stop block with symmetrical series of steps securely fixed to the elongated locating block, and a case body, which has an outer track at one side, an elongated side opening at an opposite side remote from the elongated rail, and a transverse gap through the close bottom side thereof adjacent to the elongated side opening, wherein the cover is covered on the case body when the stop block is inserted into said outer track; the cover can be turned upside-down to hold the case body in the open position for easy access of storage disks by inserting the elongated locating block and the stop block into the elongated side opening and the transverse gap, permitting storage disks to be partially pushed out of the case body for easy access.

3 Claims, 5 Drawing Sheets

DISK STORAGE BOX

BACKGROUND OF THE INVENTION

The present invention relates to a disk storage box for storing disks which automatically pushes storage disks out of the case body when the cover is turned upside-down to hold the case body in the open position.

Regular disk storage cases for storing computer disks are commonly comprised of a case body and a cover hinged to the case body. The commonly drawback of these disk storage cases is that the user cannot easily pick up a specific individual disk from a set of disks which are stored in the case body when the cover is opened. There are disk storage cases having separated compartments for storing individual disks for quick access. There are known disk storage cases using rotary knob controlled propelling means driven to lift storage disks one after another for quick finding. However, these two types of disk storage cases are complicated, and therefore their manufacturing cost is high.

SUMMARY OF THE INVENTION

It is one object of the present invention to provide a disk storage box which can be arranged into an open position to push storage disks partially out of the case for easy access. It is another object of the present invention to provide a disk storage box which is inexpensive to manufacture.

To achieve the aforesaid objects, there is provided a disk storage box comprising a cover, which has an inside elongated locating block and a stop block with symmetrical series of steps securely fixed to the elongated locating block, and a case body, which has an outer track at one side, an elongated side opening at an opposite side remote from the elongated rail, and a transverse gap through the close bottom side thereof adjacent to the elongated side opening, wherein the cover is covered on the case body when the stop block is inserted into said outer track; the cover can be turned upside-down to hold the case body in the open position for easy access of storage disks by inserting the elongated locating block and the stop block into the elongated side opening and the transverse gap, permitting storage disks to be partially pushed out of the case body for easy access.

DETAILED DESCRIPTION OF THE PREFERRED EMBODIMENT

Figure 1:
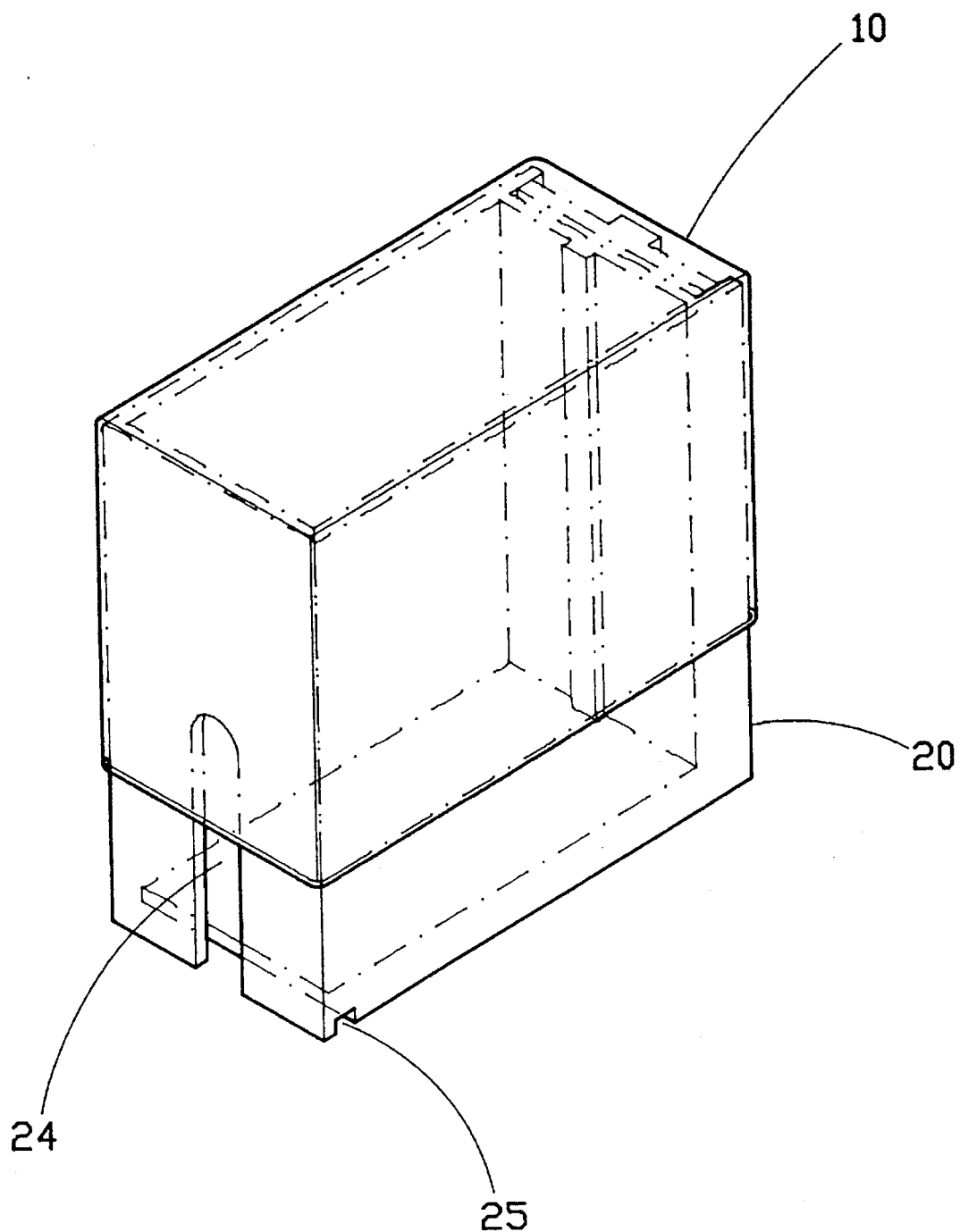
FIG. 1 is a perspective view of a disk storage box according to the present invention.
Figure 2:
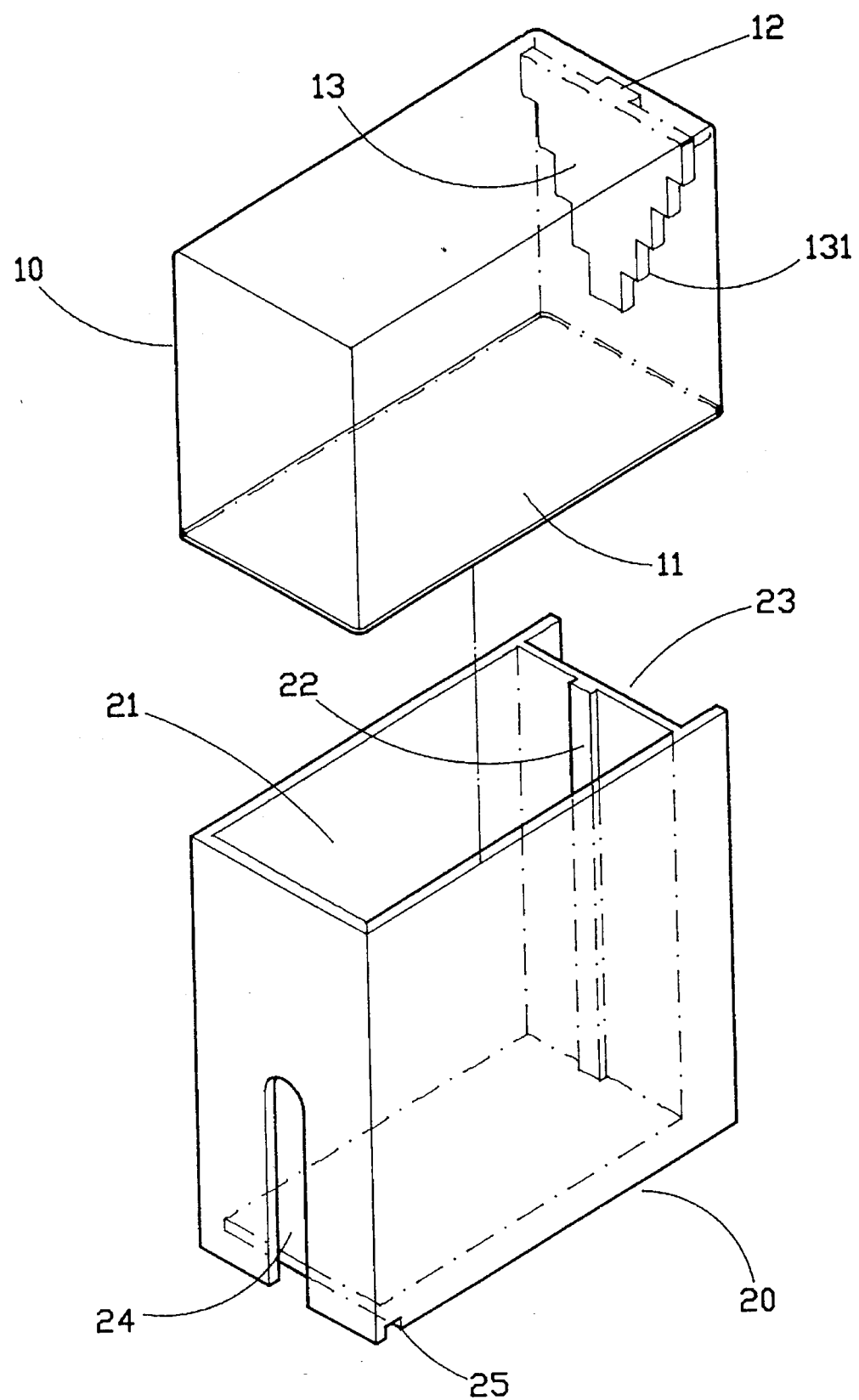
FIG. 2 is an exploded view of FIG. 1.

Referring to FIGS. 1 and 2, a disk storage box in accordance with the present invention is generally comprised of a cover 10 and a case body 20. The cover 10 defines a rectangular receiving chamber 11, which receives the case body 20, having an elongated locating block 12 raised from the inside wall thereof at one side within the rectangular receiving chamber 11 and a stop block 13 securely fixed to the outer side of the elongated locating block 12. The stop block 13 has two symmetrical series of steps 131 extended downwardly outward at two opposite sides. The case body 20 defines a rectangular storage chamber 21 for holding disks, having a rail 22 raised from the inside wall thereof at one side in the middle within the rectangular storage chamber 21 for separating storage disks into two groups, an outer track 23 at the back side of the elongated rail 22, which receives the stop block 13, an elongated side opening 24 at an opposite side remote from the elongated rail 22, and a transverse gap 25 through the bottom side thereof adjacent to the elongated side opening 24. By inserting the stop block 13 into the outer track 23, the cover 1 is covered on the case body 20.

Figure 3:
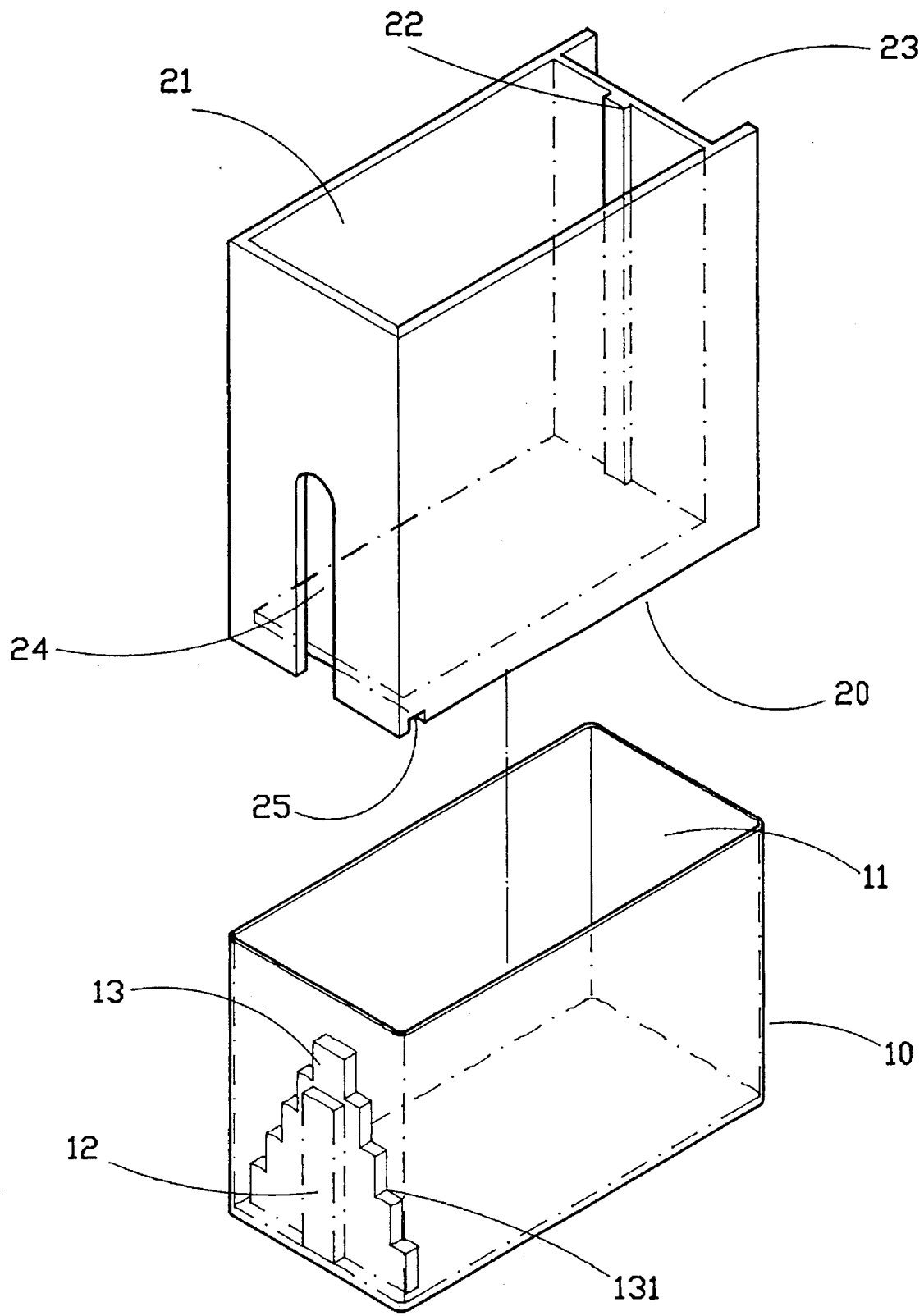
FIG. 3 shows the cover turned upside-down for holding the case body in the open position according to the present invention.
Figure 4:
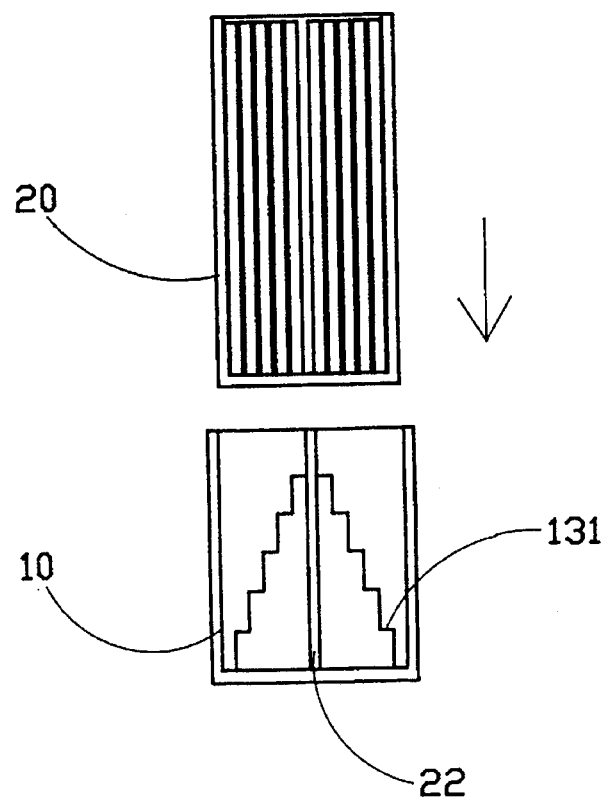
FIG. 4 is an end view showing the loading direction of the case body on the cover when the cover turned upside-down according to the present invention.
Figure 5:
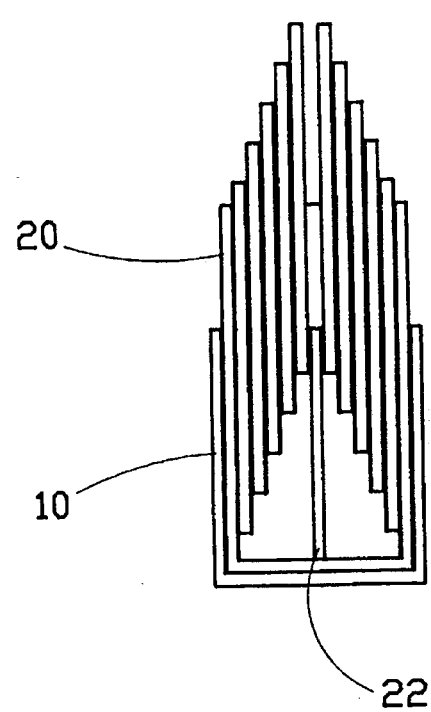
FIG. 5 is similar to FIG. 4 but showing the case body inserted into the cover.

Referring to FIGS. 3, 4, and 5, the cover 10 can be turned upside-down to hold the case body 20 in the open position for easy access of storage disks by inserting the elongated locating block 12 into the elongated side opening 24 and the stop block 13 into the transverse gap 25. When the elongated locating block 12 and the stop block 13 are respectively inserted into the elongated side opening 24 and the transverse gap 25, storage disks are partially pushed out of the top opening of the case body 20, and therefore the user can conveniently pick up individual storage disks from the case body 20.

Figure 6:
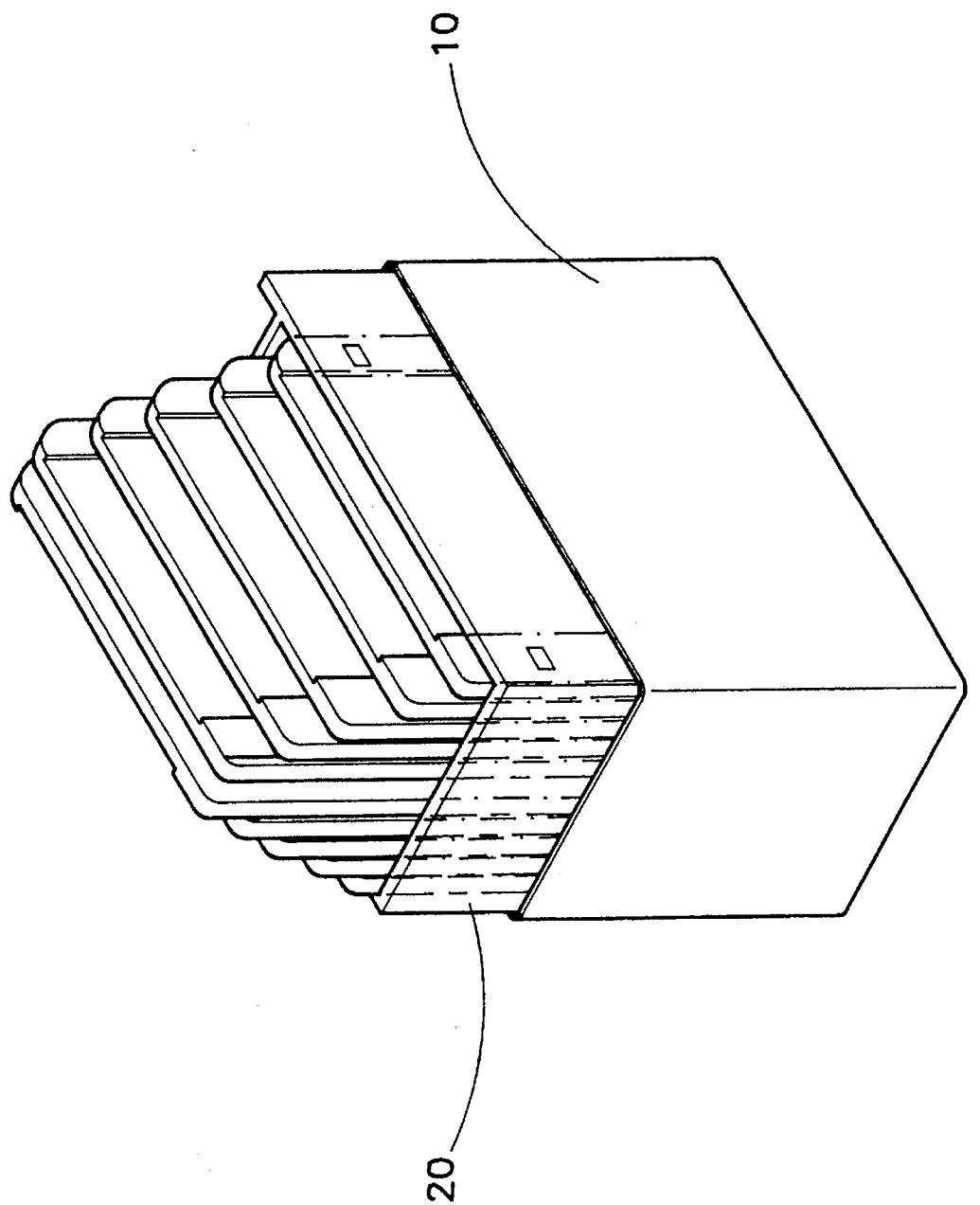
FIG. 6 is an elevational view showing the case body inserted into the cover and storage disks pushed out of the case body for easy access.

Referring to FIG. 6, when the elongated locating block 12 and the stop block 13 are respectively inserted into the elongated side opening 24 and the transverse gap 25, storage disks are partially pushed out of the top opening of the case body 20, and the labels or markings on the storage disks are shown.

While only one embodiment of the present invention has been shown and described, it will be understood that various modifications and changes could be made without departing from the spirit and scope of the invention. For example, the stop block 13 can be made having only one series of steps at one lateral side; the steps 131 can be extended upwards but not downwards.

What is claimed is:

1. A disk storage box comprising:

a cover defining a rectangular receiving chamber, having an elongated locating block inside said rectangular receiving chamber, and a stop block securely fixed to said elongated locating block, also within said rectangular receiving chamber, said stop block having at least one series of steps within said chamber; and a case body defining a rectangular storage chamber for holding disks, having an elongated rail at one side within said rectangular storage chamber for separating storage disks into two groups, said rectangular storage chamber having an open top side and a bottom wall, an outer track in a side wall thereof abutted to said elongated rail for receiving said stop block when said cover is covered on said case body, an elongated side opening at an opposite side remote from said elongated rail, and a transverse gap through the bottom wall of said rectangular storage chamber adjacent to said elongated side opening;

wherein said cover is covered on said case body over the top open side of said rectangular storage chamber when said stop block is inserted into said outer track; said cover is shaped such that, when turned upside-down, said cover supports said case body in the open position for easy access of storage disks by inserting said elongated locating block and said stop block into said elongated side opening and said transverse gap, permitting storage disks to be partially pushed out of the top open side of said rectangular storage chamber.

2. A disk storage box comprising:

a cover defining a rectangular receiving chamber, having an elongated locating block at one side inside said rectangular receiving chamber, and a stop block securely fixed to said elongated locating block at an outer side within said rectangular receiving chamber, said stop block having a first and second series of steps; and a case body defining a rectangular storage chamber for holding disks, having an elongated rail at one side within said rectangular storage chamber for separating storage disks into two groups between said first and second series of steps, said rectangular storage chamber having an open top side and a bottom wall, an outer track adjacent said chamber, within said case body, and abutting said elongated rail for receiving said stop block when said cover is covered on said case body, an elongated side opening at an opposite side remote from said elongated rail, and a transverse gap through the bottom wall of said rectangular storage chamber adjacent to said elongated side opening;

wherein said cover is covered on said case body over the top open side of said rectangular storage chamber when said stop block is inserted into said outer track; said cover is shaped such that, when turned upside-down, said cover will hold said case body in the open position for easy access of storage disks by inserting said elongated locating block and said stop block into said elongated side opening and said transverse gap, permitting storage disks to be partially pushed out of the top open side of said rectangular storage chamber.

3. A disk storage box comprising:

a cover defining a rectangular receiving chamber, having an elongated locating block at one side inside said rectangular receiving chamber, and a stop block securely fixed to said elongated locating block at an outer side within said rectangular receiving chamber, said stop block having two series of steps at two opposite sides of said chamber; and a case body defining a rectangular storage chamber for holding disks, having an elongated rail at one side within said rectangular storage chamber for separating storage disks into two groups, said rectangular storage chamber having an open top side and a bottom wall, an outer track in a side wall thereof abutted to said elongated rail for receiving said stop block when said cover is covered on said case body, an elongated side opening at an opposite side remote from said elongated rail, and a transverse gap through the bottom wall of said rectangular storage chamber adjacent to said elongated side opening;

wherein said cover is covered on said case body over the top open side of said rectangular storage chamber when said stop block is inserted into said outer track; said cover is shaped such that, when turned upside-down, said cover holds said case body in the open position for easy access of storage disks by inserting said elongated locating block and said stop block into said elongated side opening and said transverse gap, permitting storage disks to be partially pushed out of the top open side of said rectangular storage chamber.

* * * * *